No. 755,983. PATENTED MAR. 29, 1904.
R. W. WOOD.
COLOR PHOTOGRAPH AND PROCESS OF MAKING SAME.
APPLICATION FILED FEB. 14, 1899.
NO MODEL.

Witnesses:
Charles J. Schmidt.
Harvy L. Hanson.

Inventor,
Robert W. Wood
By Charles A. Brown
Attorney.

No. 755,983. Patented March 29, 1904.

UNITED STATES PATENT OFFICE.

ROBERT W. WOOD, OF MADISON, WISCONSIN.

COLOR PHOTOGRAPH AND PROCESS OF MAKING SAME.

SPECIFICATION forming part of Letters Patent No. 755,983, dated March 29, 1904.

Application filed February 14, 1899. Serial No. 705,490. (No specimens.)

*To all whom it may concern:*

Be it known that I, ROBERT W. WOOD, a citizen of the United States, residing at Madison, in the county of Dane and State of Wisconsin, have invented a certain new and useful Improvement in Color Photographs and Processes of Making the Same, of which the following is a full, clear, concise, and exact description.

My invention consists in a method of producing photographic positives in color, as by means of a diffraction-grating of varying grating-space, the distance between the grating-lines varying with the color in different parts of the picture.

The method described herein of carrying out my invention depends on the principle that the spectrum produced by a diffraction-grating, in combination with a lens on which parallel rays of light are directed, is displaced with reference to the direct image of the light source produced by the lens alone, and when viewed by an eye placed in this spectrum the grating will appear illuminated with light of a color depending on the part of the spectrum in which the eye is placed. If in any part of the grating the spacing between the lines be different, that portion will have a different color, since the spectrum formed by this portion is displaced relatively to the other, and consequently light of a different color comes to the eye from this area of the grating. If a diffraction-grating be made up of patches in which the spacing between the lines is different, these patches will appear in colors depending on the distance between the lines, and a colored picture can be produced by a proper distribution of these patches, as I shall presently point out.

The accompanying drawings will serve to make my invention more readily comprehended.

Figures 1, 3:
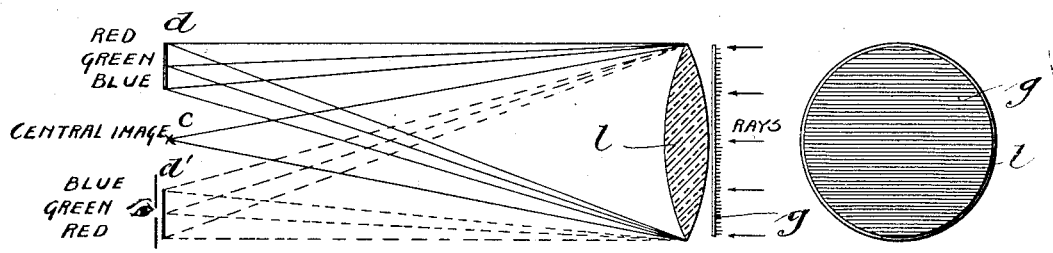
Figures 2, 4:
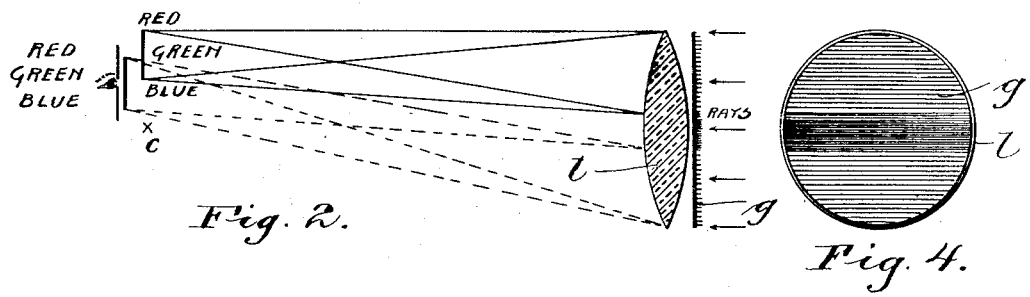
Figure 6:
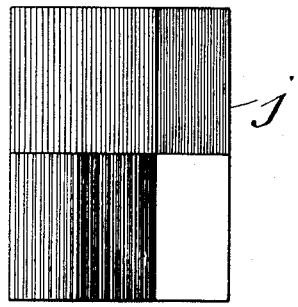
Figures 7, 8, 9:
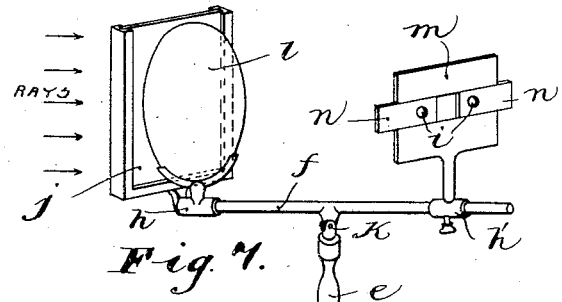
Figure 5:
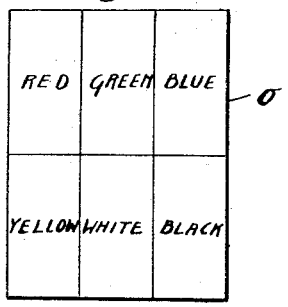
Figures 10, 11, 12:
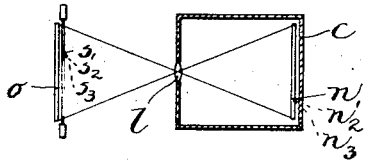

In the drawings, Figure 1 is a diagrammatic view showing a diffraction-grating of uniform grating-space in connection with a lens, the projection of the spectra being diagrammatically indicated. Fig. 2 is a similar view with the diffraction-grating provided with varying and overlapping grating-space. Fig. 3 is a front view of the diffraction-grating indicated in Fig. 1 with the lens in place. Fig. 4 is a front view of the diffraction-grating indicated in Fig. 2 with the lens in place. Fig. 5 is a diagrammatic view of a multicolored object to be photographed, the different colors being named on the drawing. Fig. 6 shows the distribution of the grating-lines of a finished picture of the object shown in Fig. 5. Fig. 7 is a perspective view of a viewing apparatus constructed in accordance with my invention. Fig. 8 illustrates the manner in which the colored object is photographed through a screen. Fig. 9 illustrates the manner in which a sensitizing-plate may be printed with a diffraction-grating. Figs. 10, 11, and 12 show the manner in which the finished colored photograph to be is successively printed with different diffraction-plates.

Like letters indicate like parts in the different views.

Figs. 1 and 2 are diagrams representing lenses $l$ in combination with diffraction-gratings $g$ of uniform and varying grating-space. It will be understood that the lines of the diffraction-grating are in reality microscopic and invisible to the naked eye. The image of the light source is represented at $c$. The spectra of the colored rays resulting from the interference caused by the diffraction-grating are represented at $d$ and $d'$. In these latter spectra the colors will appear in their natural order of red, green, and blue, the red being most displaced. If the grating be made up of two sets of lines of proper spacing, as shown in Fig. 2, two overlapping spectra will be formed, the red of one falling on the green of the other, and an eye placed at this point receives red light from one part of the grating and green from another. Consequently the former appears red, the latter green. If in any place these two spacings overlap—that is, if both sets of lines are superimposed—then the eye receives both red and green light from this portion, which consequently appears yellow, since yellow is formed by a mixture of red and green lights. We can now imagine a third spacing to be present in some part of the grating, such that the blue of its spectrum falls on the spot where the red and green of the other two are superimposed. The eye will now see this latter area illuminated with blue light. If in any place all three spacings are present—that is, if the three sets of lines are superimposed—then the eye will receive red, green, and blue light from the portion, which will appear white in consequence.

One way in which I have produced the colored photographs is as follows: Three negatives, $n'$, $n^2$, and $n^3$ of the object $o$, which may be diagrammatically illustrated by Fig. 5, are first taken with a camera $c$ through red, green, and blue screens $s'$, $s^2$, and $s^3$ in a usual manner, as illustrated in Fig. 8, and from these positives $p'$, $p^2$, and $p^3$ are made on glass plates. These positives are now flowed with a solution of gelatin and bichromate of potash or any other suitable sensitizing solutions, and three diffraction-gratings $d'$, $d^2$, and $d^3$, adapted to throw upon the three positives red, green, and blue light, respectively, are then photographed by contact-printing directly on the films of the positives in a manner as shown in Fig. 9, the grating that is intended to give red light being impressed on the positive made from the negative taken through the red screen, the grating intended to give the green light being impressed on the positive made from the negative taken through the green screen and the grating intended to give the blue light being impressed upon the positive taken through the blue screen. A glass plate $j$, coated with bichromated gelatin or other suitable sensitizing material, is now exposed in succession under these three positives, as shown in Figs. 10, 11, and 12, proper registration being secured by the sides of a frame $q$ or by marks on the plates, and on being washed with warm water or otherwise developed this plate $j$ becomes the finished colored photograph illustrated in Fig. 6.

A modification of the process just described, but not differing in essential fundamental principles, is as follows: I provide the camera $C$ with three screens $d'$, $d^2$, and $d^3$ of red, green, and blue glass, on which the respective diffraction-gratings have been ruled or photographed. A sensitive plate $p$ of fine grain is exposed under the three screens in succession. This plate when developed and viewed as I will describe appears as a colored positive, and to impress the colors on the eye of the observer I provide a viewing apparatus for combining the lens and the photograph and determining the directions from which the photograph is viewed. This viewing apparatus comprises a stand $e$, supporting a cross piece or frame $f$, on the ends of which are mounted slides $h$ and $h'$ for respectively supporting a lens $l$ and the associated colored positive $j$ and the screen $m$. A source of light—as, for instance, an incandescent light—may be placed a proper distance behind the positive $j$, which positive plate is located between the source of light and the lens $l$. The screen $m$ is made of opaque material, in which openings are provided to form eyeholes $i\ i$. I provide an adjustable connection $k$ for regulating the angle of the arm on which the lens, photograph, and eyepiece are mounted, and the slidable mountings $h$ and $h'$ allow regulation of the relative positions of the lens and screen, as shown. The lens is made of such focus that corresponding spectra formed on each side of the central uncolored image are at a distance apart equal to the distance between the eyes. As the eyeholes coincide with the superposed portions of the spectra, the color may be seen by both eyes at once. Slides $n\ n$ are provided for altering the position of the eyeholes $i\ i$ and for changing the distance between them. The yellows of the picture are produced by the mixture of red and green, and in those parts of the picture the two corresponding gratings are superposed. White is produced in all parts of the picture where all three of the gratings are impressed. A contact-print taken on a second glass plate coated with bichromated gelatin from the original color photograph shows all the colors equally well and is positive also. Consequently copies can be made in color as easily as "blue prints," and from each one of these others can be struck off, all being positive.

It will be observed that the effect of photographing an object through a colored screen is to produce a partial photograph of those portions of the object having the color of the screen, the parts or portions of the object having the color of the screen being selected and permitted to pass through the screen, while the other colors are substantially absorbed by the screen. It will also be observed that photographing with the gratings is to virtually photograph in various lights produced by such gratings. As a result it will be seen that in accordance with my invention I select out parts or portions of the object having different colors and photograph the same in correspondingly-colored lights, the selection of the various parts or portions being done by the variously-colored screens and the photographing in the correspondingly-colored lights being due to the photographing through the medium of gratings. In the first one of the methods set forth herein the selection of the parts or portions having different colors occurs first by the photographing of the object through different-colored screens upon separate negatives and the photographing of the different parts or portions in the correspondingly-colored lights is subsequently done by the subsequent photographing of the object upon the partial positives obtained from such negatives through the various gratings after the positives have been sensitized. In the latter one of the two methods the selecting of the different portions or parts of the object having different colors and their photographing in the correspondingly-colored lights occurs simultaneously, this being due to the fact that the photographing of the object through the various gratings is done in connection with the various colored screens. In either case it will be seen the different parts or portions of the object having different colors are selected and photographed in correspondingly-colored lights.

While I have described in detail one of the methods I follow in impressing a colored picture upon the eye of the observer, numerous modifications in the details of this process will suggest themselves to those skilled in the art. My invention is not limited to this specific process which I have described.

I believe that it is broadly new with me to reproduce by photography the colors of the object photographed through the instrumentality of a diffraction-grating of varying grating-space.

Having thus described my invention, what I claim as new, and desire to secure by Letters Patent, is—

1. The method of producing a multicolored photograph which consists in photographing parts of an object having a given color, through a diffraction-grating adapted to produce the same color, substantially as described.

2. The method of producing a multicolored photograph which consists in superposing and registering monochrome photographs, each of a different color, and each of which is a photograph of similarly-colored parts of a multicolored object through a diffraction-grating adapted to produce the same color, substantially as described.

3. The method of producing a multicolored photograph which consists of photographing an object through screens of different colors, and through a diffraction-grating adapted to produce colors corresponding to those of the screens, substantially as described.

4. The method of producing a multicolored photograph which consists in photographing an object through screens of different colors and through diffraction-gratings associated therewith, each adapted to produce a color corresponding to the color of the screen used therewith, and preparing a composite positive from the results of such photographic acts, substantially as set forth.

5. The method of producing a multicolored photograph which consists in successively photographing a multicolored object upon a sensitive element through a series of different-colored screens and through a diffraction-grating associated with each of said screens, the color adapted to be produced by each diffraction-grating corresponding with the color of its associated screen, substantially as set forth.

6. As an article of manufacture, a photograph consisting of a surface having areas of diffraction-rulings of different spacings, each spacing of diffraction-ruling being adapted to produce a different color, substantially as set forth.

7. As an article of manufacture, a photograph consisting of a surface having areas of superimposed diffraction-rulings of different spacings, each spacing of diffraction-ruling being adapted to produce a different color, substantially as set forth.

8. The method of producing a positive photograph, which consists in first taking separate negatives of the object to be photographed, through red, green and blue screens, from these negatives producing positives on glass, covering these positives with a sensitizing solution, photographing upon each positive a diffraction-grating adapted to give its appropriate color, exposing a sensitized plate in succession under these positives, and finally developing this plate, substantially as described.

In witness whereof I hereunto subscribe my name this 21st day of January, A. D. 1899.

ROBT. W. WOOD.

Witnesses:
CHARLES A. BROWN,
D. W. C. TANNER.